(12) United States Patent
Rakshit et al.

(10) Patent No.: US 11,816,563 B2
(45) Date of Patent: Nov. 14, 2023

(54) METHOD OF ENABLING SPARSE NEURAL NETWORKS ON MEMRESISTIVE ACCELERATORS

(71) Applicant: Samsung Electronics Co., Ltd., Suwon-si (KR)

(72) Inventors: Titash Rakshit, Austin, TX (US); Ryan M. Hatcher, Austin, TX (US); Jorge A. Kittl, Austin, TX (US); Borna J. Obradovic, Leander, TX (US); Engin Ipek, Pittsford, NY (US)

(73) Assignee: Samsung Electronics Co., Ltd., Yongin-si (KR)

( * ) Notice: Subject to any disclaimer, the term of this patent is extended or adjusted under 35 U.S.C. 154(b) by 1051 days.

(21) Appl. No.: 16/409,487

(22) Filed: May 10, 2019

(65) Prior Publication Data

US 2020/0234114 A1    Jul. 23, 2020

Related U.S. Application Data

(60) Provisional application No. 62/793,731, filed on Jan. 17, 2019.

(51) Int. Cl.
*G06F 11/07* (2006.01)
*G06F 11/10* (2006.01)
(Continued)

(52) U.S. Cl.
CPC .............. *G06N 3/08* (2013.01); *G06F 17/16* (2013.01)

(58) Field of Classification Search
CPC ......... G06F 17/16; G06N 3/0635; G06N 3/08
See application file for complete search history.

(56) References Cited

U.S. PATENT DOCUMENTS

| 10,127,495 | B1 | 11/2018 | Bopardikar et al. |
| 2017/0185888 | A1 | 6/2017 | Chen et al. |

(Continued)

FOREIGN PATENT DOCUMENTS

| CN | 107704916 A | 2/2018 |
| CN | 109214508 A | 1/2019 |
| WO | WO 2018/078451 A1 | 5/2018 |

OTHER PUBLICATIONS

Feinberg et al., "Enabling Scientific Computing on Memristive Accelerators," Department of Electrical and Computer Engineering, 16 pages, 2018.

(Continued)

*Primary Examiner* — Yong J Choe
(74) *Attorney, Agent, or Firm* — Lewis Roca Rothgerber Christie LLP

(57) ABSTRACT

A method of storing a sparse weight matrix for a trained artificial neural network in a circuit including a series of clusters. The method includes partitioning the sparse weight matrix into at least one first sub-block and at least one second sub-block. The first sub-block includes only zero-value weights and the second sub-block includes non-zero value weights. The method also includes assigning the non-zero value weights in the at least one second sub-block to at least one cluster of the series of clusters of the circuit. The circuit is configured to perform matrix-vector-multiplication (MVM) between the non-zero value weights of the at least one second sub-block and an input vector during an inference process utilizing the artificial neural network. The sub-blocks containing all zero elements are power gated, thereby reducing overall energy consumption for inference.

20 Claims, 6 Drawing Sheets

(51) Int. Cl.
  *G06N 3/08*    (2023.01)
  *G06F 17/16*   (2006.01)

(56) References Cited

U.S. PATENT DOCUMENTS

| | | |
|---|---|---|
| 2018/0046895 A1 | 2/2018 | Xie et al. |
| 2018/0189645 A1 | 7/2018 | Chen et al. |
| 2019/0042251 A1 | 2/2019 | Nurvitadhi et al. |
| 2019/0042529 A1 | 2/2019 | Nurvitadhi et al. |
| 2019/0042615 A1 | 2/2019 | Akin et al. |
| 2019/0042909 A1 | 2/2019 | Sumbul et al. |
| 2019/0042915 A1 | 2/2019 | Akin et al. |
| 2019/0045188 A1* | 2/2019 | Mahdi ............... H04N 19/14 |
| 2020/0110989 A1* | 4/2020 | Xu ..................... G06F 17/16 |

OTHER PUBLICATIONS

Zhang et al., "Cambricon-X: An Accelerator for Space Neural Networks," IEEE, 12 pages, 2016.

El-Sayed, et al., "Hardware Implementation and Evaluation of the Flexible Router Architecture for NoCs", 2013 IEEE 20th International Conference on Electronics, Circuits, and Systems (ICECS), IEEE, Dec. 8-11, 2013, 4 pages.

Xue, et al., "User Cooperation Network Coding Approach for NoC Performance Improvement", NOCS '15 Proceedings of the 9th International Symposium on Networks-on-Chip, Article No. 17, Vancouver, BC, Canada, Sep. 28-30, 2015, 8 pages.

Taiwanese Office Action for TW Application No. 109101644 dated May 2, 2023, 7 pages.

\* cited by examiner

METHOD OF ENABLING SPARSE NEURAL NETWORKS ON MEMRESISTIVE ACCELERATORS

CROSS-REFERENCE TO RELATED APPLICATION(S)

This application claims priority to and the benefit of U.S. Provisional Application No. 62/793,731, filed Jan. 17, 2019, the entire contents of which are incorporated herein by reference.

BACKGROUND

1. Field

The present disclosure relates generally to methods of storing weights for neuron synapses of sparse artificial neural networks.

2. Description of Related Art

Artificial neural networks (ANNs) are utilized for a variety of tasks, including image recognition, natural language processing, and various pattern-matching and classification tasks. In general, artificial neural networks include an input layer, an output layer, and one or more hidden layers each including a series of neurons. The outputs of the neurons of each layer are connected to all of the neuron inputs of the next layer. Each connection between the neurons has a "weight" associated with it. The activation of each neuron is computed by performing a weighted sum of the inputs to the neurons and transferring the linear combination of the weighted inputs into a thresholding activation function with a transfer function. Accordingly, the artificial neural network performs a matrix-vector-multiplication (MVM) of an input vector by a matrix of weights, followed by a summation (e.g., a linear combination of input signals), which is then thresholded by a comparator.

Once the artificial neural network has been trained to perform a particular task, it can accurately predict outputs when presented with inputs, a process known as artificial neural network inference. The weights of the trained artificial neural network may be stored locally to the neuron-neuron interconnections to perform the multiply-and-add operations of the artificial neural network fast and energetically efficiently. For instance, some related art systems utilize analog memory elements for the storage of the neuron weights, with the conductance of the analog memory element representing the weight. The higher the conductance, the higher the weight and therefore the greater the influence of the neuron input which utilizes that conductance. However, sparse weight matrices, which include a large number of zero-value coefficients, may reduce the performance of the inference process and may be energetically inefficient due to the performance of trivial computations such as multiplying by zeros or adding zeros.

SUMMARY

The present disclosure is directed to various embodiments of a method of storing a sparse weight matrix for a trained artificial neural network in a circuit including a series of clusters. In one embodiment, the method includes partitioning the sparse weight matrix into at least one first sub-block and at least one second sub-block. The at least one first sub-block includes only zero-value weights and the at least one second sub-block includes non-zero value weights. The method also includes assigning the non-zero value weights in the at least one second sub-block to at least one cluster of the series of clusters of the circuit. The circuit is configured to perform matrix-vector-multiplication (MVM) between the non-zero value weights of the at least one second sub-block and an input vector.

The method may include identifying clusters of the series of clusters that were not assigned at least one non-zero value weight during the assigning the non-zero value weights.

The method may include completely cutting off power to the clusters (power gated) that were not assigned at least one non-zero value weight.

The circuit may include an array of memristors.

Each of the memristors may be resistive random access memory (RRAM), conductive-bridging random access memory (CBRAM), phase-change memory (PCM), a ferroelectric field effect transistor (FerroFET), or spin-transfer torque random access memory (STT RAM).

Assigning the non-zero value weights may include setting, utilizing a series of selectors connected in series to the memristors, a resistance of each of the memristors.

The sparse weight matrix may have a size of 512×512, the at least one first sub-block may have a size of 256×256, and the at least one second sub-block may have a size of 128×128, 64×64, or 32×32.

Partitioning the sparse weight matrix may include comparing, recursively, a size of the at least one second sub-block to a size of a smallest cluster of the series of clusters.

If the size of the at least one second sub-block is equal to the size of the smallest cluster, the method may also include calculating a first energy cost of processing the non-zero value weights utilizing an unblocked element cluster including an unblocked element buffer and at least one digital arithmetic logic unit, calculating a second energy cost of processing the non-zero value weights with the smallest cluster, determining a lower energy cost among the first energy cost and the second energy cost, and assigning the non-zero value weights to the unblocked element cluster or the smallest cluster depending on the lower energy cost.

If the size of the at least one second sub-block is larger than the size of the smallest cluster, the method may further include sub-partitioning the at least one second sub-block into a series of sub-regions having sizes matching sizes of a first series of clusters of the series of clusters, calculating a first total energy cost of processing the non-zero value weights of each of the series of sub-regions with the first series of clusters, calculating a second total energy cost of processing the non-zero value weights of the second sub-block with a single cluster having a same size as the second sub-block, determining a lower total energy cost among the first total energy cost and the second total energy cost, and assigning the non-zero value weights of the series of sub-regions to the first series of clusters or assigning the non-zero value weights of the at least one second sub-block to the single cluster depending on the lower total energy cost.

The present disclosure is also directed to various embodiments of a system for performing inference with an artificial neural network having a sparse weight matrix. In one embodiment, the system includes a network-on-chip including a series of clusters, each cluster of the series of clusters including an array of memristor crossbars. In one embodiment, the system also includes a processor and a non-transitory computer-readable storage medium having instructions stored therein, which, when executed by the processor, cause the processor to partition the sparse weight matrix into at least one first sub-block and at least one second sub-block, the at least one first sub-block including only zero-value weights and the at least one second sub-block including non-zero value weights, and assign the non-zero value weights in the at least one second sub-block to at least one cluster of the series of clusters of the circuit. The circuit is configured to perform matrix-vector-multiplication (MVM) between the non-zero value weights of the at least one second sub-block and an input vector.

The instructions, when executed by the processor, may further cause the processor to identify clusters of the series of clusters that were not assigned at least one non-zero value weight.

The instructions, when executed by the processor, may further cause the processor to completely cut off power to the clusters that were not assigned at least one non-zero value weight.

Each memristor of the array of memristor crossbars may be resistive random access memory (RRAM), conductive-bridging random access memory (CBRAM), phase-change memory (PCM), a ferroelectric field effect transistor (FerroFET), or spin-transfer torque random access memory (STT RAM).

The network-on-chip may further include a series of selectors connected in series to the memresistor crossbars, and the instructions, when executed by the processor, may further cause the processor to assign the non-zero weights by setting a resistance of the memristor crossbars utilizing the selectors.

The sparse weight matrix may have a size of 512×512, the at least one first sub-block may have a size of 256×256, and the at least one second sub-block may have a size of 128×128, 64×64, or 32×32.

The instructions, when executed by the processor, may further cause the processor to compare, recursively, a size of the at least one second sub-block to a size of a smallest cluster of the series of clusters.

If the size of the at least one second sub-block is equal to the size of the smallest cluster, the instructions may further cause the processor to calculate a first energy cost of processing the non-zero value weights utilizing an unblocked element cluster including an unblocked element buffer and at least one digital arithmetic logic unit, calculate a second energy cost of processing the non-zero value weights with the smallest cluster, determine a lower energy cost among the first energy cost and the second energy cost, and assign the non-zero value weights to the unblocked element cluster or the smallest cluster depending on the lower energy cost.

If the size of the at least one second sub-block is larger than the size of the smallest cluster, the instructions, when executed by the processor, may further cause the processor to sub-partition the at least one second sub-block into a series of sub-regions having sizes matching sizes of a first series of clusters of the series of clusters, calculate a first total energy cost of processing the non-zero value weights of each of the series of sub-regions with the first series of clusters, calculate a second total energy cost of processing the non-zero value weights of the second sub-block with a single cluster having a same size as the second sub-block, determine a lower total energy cost among the first total energy cost and the second total energy cost, and assign the non-zero value weights of the series of sub-regions to the first series of clusters or assign the non-zero value weights of the at least one second sub-block to the single cluster depending on the lower total energy cost.

The present disclosure is also directed to various embodiments of a non-transitory computer-readable storage medium. In one embodiment, the non-transitory computer-readable storage medium has software instructions stored therein, which, when executed by a processor, cause the processor to partition a sparse weight matrix of an artificial neural network into at least one first sub-block and at least one second sub-block, the at least one first sub-block comprising only zero-value weights and the at least one second sub-block comprising non-zero value weights, and assign the non-zero value weights in the at least one second sub-block to at least one cluster of a network-on-chip including an array of memristor crossbars.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
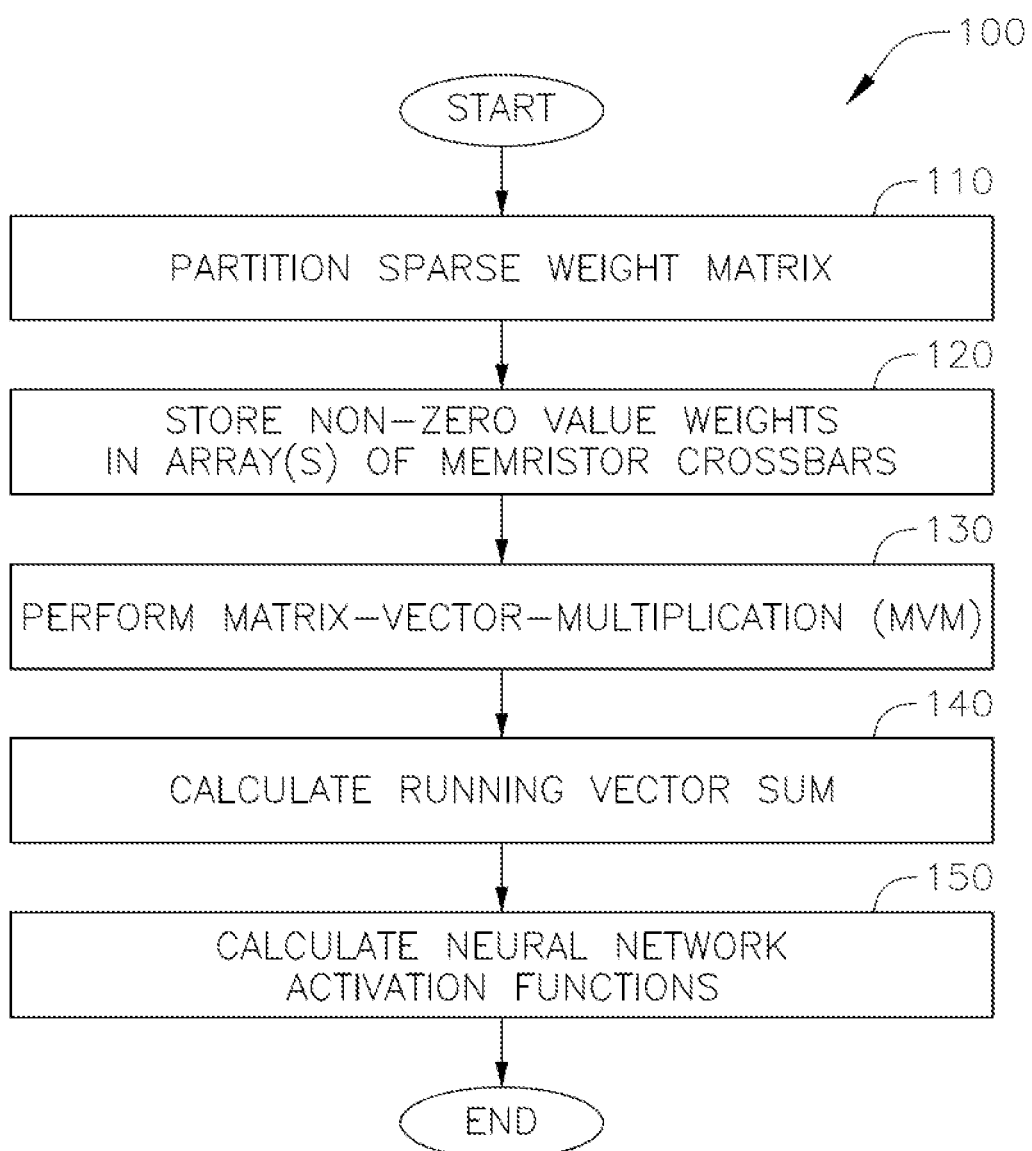
FIG. 1 is a flowchart illustrating tasks of a method of storing a sparse weight matrix of a trained artificial neural network in a circuit according to one embodiment of the present disclosure.

The present disclosure is directed to various systems and methods of storing in a circuit the weight coefficients of a sparse weight matrix for a trained artificial neural network and performing an artificial neural network inference process with the circuit. The circuit includes a series of clusters, and each cluster includes an array of memristor crossbars, such as resistive random access memory (RRAM), conductive-bridging random access memory (CBRAM), phase-change memory (PCM), a ferroelectric field effect transistor (FerroFET), or spin-transfer torque random access memory (STT RAM). The memristors may be either analog or digital (e.g., single or multi-bit). Each cluster is configured to perform an analog or digital matrix-vector multiplication (MVM) between the weights of the sparse weight matrix and an input vector as the data flows from one layer to another layer of the artificial neural network during inference. The systems and methods of the present disclosure include partitioning the sparse weight matrix into at least two sub-blocks, with at least one sub-block containing only zero weight coefficients, and then mapping only those sub-blocks containing non-zero weight coefficients to the arrays of memristor crossbars. In this manner, the systems and methods of the present disclosure are configured to improve performance of the artificial neural network inference process and are configured to be energetically efficient by avoiding performance of trivial computations such as multiplying by zeros or adding zeros in the MVM operations.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a flowchart illustrating tasks of a method 100 of performing artificial neural network inference with a memristor accelerator according to one embodiment of the present disclosure. In the illustrated embodiment, the method 100 includes a task 110 of partitioning a sparse weight matrix of a trained artificial neural network into at least one first sub-block containing only zero-value weight coefficients and at least one second sub-block containing non-zero value weight coefficients. The task 110 of partitioning the sparse weight matrix may be performed by any suitable process or processes, such as, for instance, diagonalization of the sparse weight matrix. Diagonalization of the sparse weight matrix includes determining the eigenvalues of the sparse weight matrix. As used herein, the term "sparse weight matrix" refers to a weight matrix having most or approximately most of its weight coefficients being zero-value or substantially zero-value.

Figure 2:
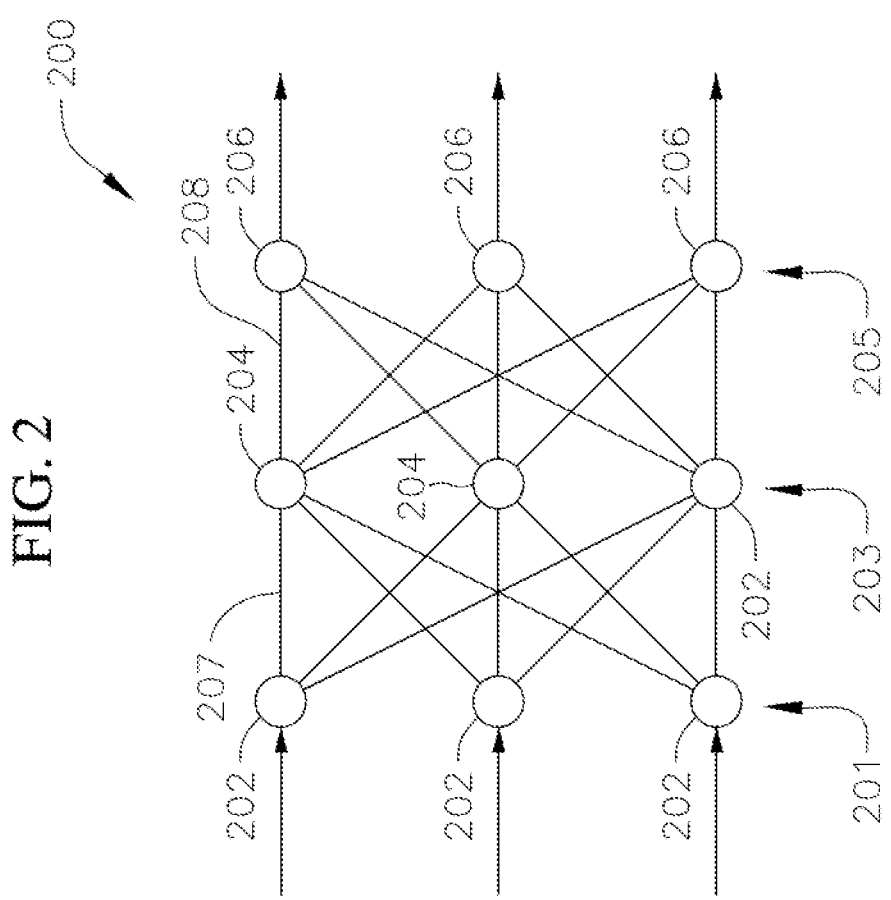
FIG. 2 depicts the trained artificial neural network according to one embodiment of the present disclosure.

FIG. 2 depicts a trained artificial neural network 200 according to one embodiment of the present disclosure that may be utilized in the method 100 of FIG. 1 to perform artificial neural network inference. In the illustrated embodiment, the artificial neural network 200 includes an input layer 201 having a series of input layer neurons 202, at least one hidden layer 203 including a series of hidden layer neurons 204, and an output layer 205 having a series of output layer neurons 206. The output of each of the input layer neurons 202 is connected to each of the hidden layer neurons 204 with a series of connections or synapses 207, and the output of each of the hidden layer neurons 204 is connected to each of the output layer neurons 206 with a series of connections or synapses 208. Each connection 207, 208 between the neurons 202, 204, 206 has a "weight" associated with it, and the weights of the connections 207, 208 from one layer to the next layer of the artificial neural network 200 are stored in a weight matrix. In one or more embodiments, the artificial neural network 200 may have any other suitable number of layers and each layer may include any other suitable number of neurons, depending, for instance, on the type of task the artificial neural network 200 is trained to perform. In the illustrated embodiment, the sparse weight matrix partitioned according to task 110 may be the weight matrix associated with the connections 207 between the input layer and the hidden layer 203, or connections 208 between the hidden layer 203 and the output layer 205.

Figure 3:
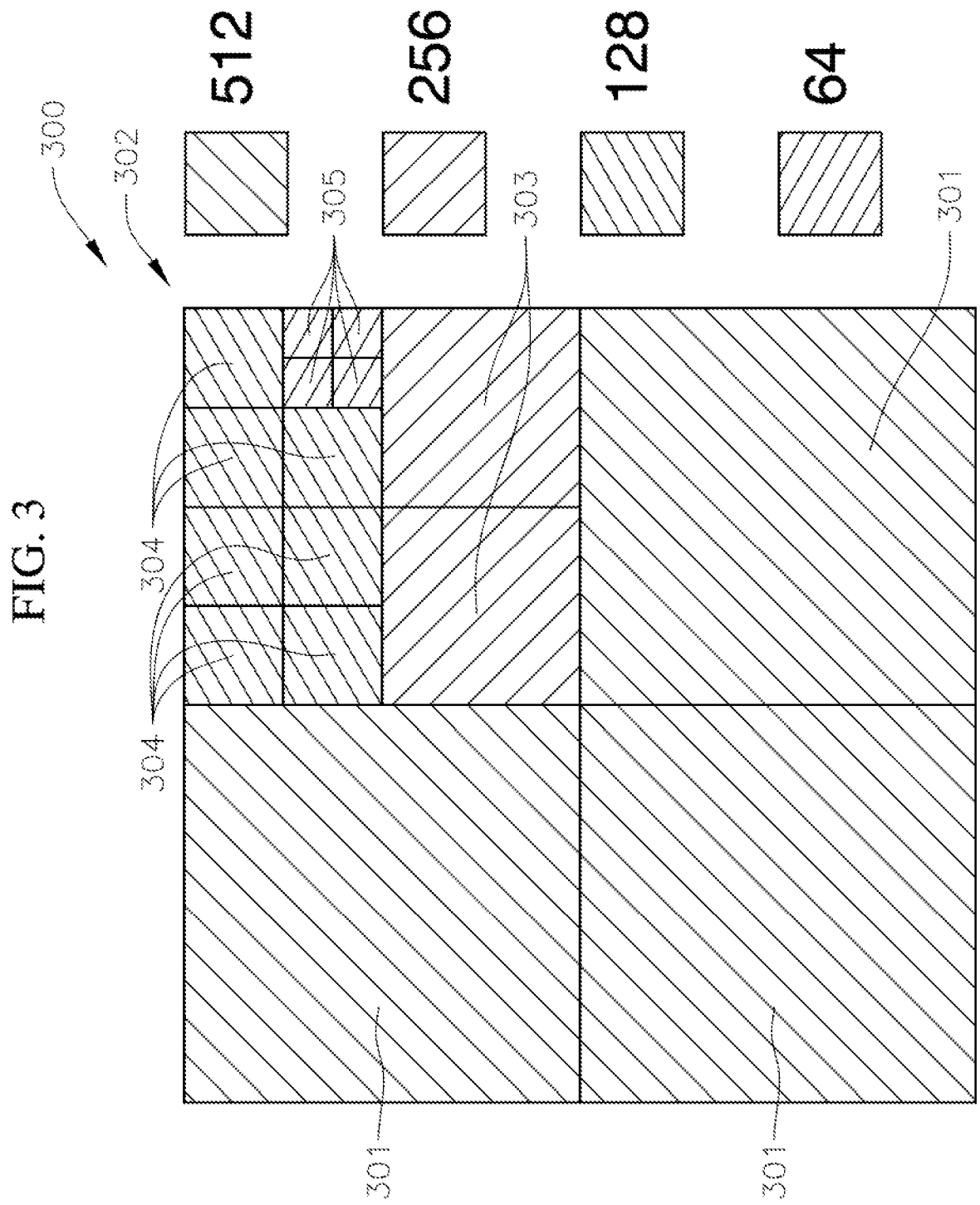
FIG. 3 depicts a task of partitioning the sparse weight matrix into sub-blocks according to the method of FIG. 1.

FIG. 3 illustrates a sparse weight matrix 300 that was partitioned according to the task 110 illustrated in FIG. 1. In the illustrated embodiment, the sparse weight matrix 300 has a size of 1024×1024, although in one or more embodiments, the sparse weight matrix 300 may have any other suitable size, depending on the number of neurons in each layer of the artificial neural network 200. Additionally, in the illustrated embodiment, the sparse weight matrix 300, following task 110, has been partitioned into three first sub-blocks 301, each of which contains only zero-value weight coefficients and each of which has a size of 512×512, although in one or more embodiments the sparse weight matrix 300 may be partitioned into any other number of first sub-blocks 301 and each of the first sub-blocks 301 may have any other suitable size depending on overall size of the sparse weight matrix 300 and the sparsity of the sparse weight matrix 300.

In the illustrated embodiment, the sparse weight matrix 300, following task 110, has been partitioned into a second sub-block 302, which contains non-zero weight coefficients, that has a size of 512×512. In one or more embodiments, the second sub-block 302 may have any other suitable size depending on overall size of the sparse weight matrix 300 and the sparsity of the sparse weight matrix 300. Additionally, in the illustrated embodiment, the second sub-block 302 has been further partitioned (i.e., sub-partitioned), following the task 110 of partitioning the sparse weight matrix 300, into two sub-regions 303 each containing non-zero weight coefficients and each having a size of 256×256, six sub-regions 304 each containing non-zero weight coefficients and each having a size of 128×128, and four sub-regions 305 each containing non-zero weight coefficients and each having a size of 64×64. Together, the sub-regions 303, 304, 305 form the second sub-block 302. In one or more embodiments, the second sub-block 302 may be sub-partitioned into any other suitable number of sub-regions having any suitable sizes. As described in more detail below, the sizes of the sub-regions 303, 304, 305 may be selected depending on the sizes of clusters (i.e., the sizes of the arrays of memristor crossbars) within the accelerator and the energy costs associated with storing the non-zero value weights of the sub-regions 303, 304, 305 in those clusters.

With continued reference to the embodiment illustrated in FIG. 1, the method 100 also includes a task 120 of storing the weights in the second sub-block 302 in one or more clusters each including an array of memristor crossbars (i.e., the task 120 includes mapping the non-zero weight coefficients in the second sub-block 302 into one or more arrays of memristor crossbars). In one or more embodiments, the task 120 includes mapping the non-zero value weights of the entire second sub-block 302 onto a single cluster (i.e., a single array of memristor crossbars) having the same size as the second sub-block (e.g., 512×512). In one or more embodiments in which the task 110 includes sub-partitioning the second sub-block 302 into two or more sub-regions (e.g., the sub-regions 303, 304, 305 illustrated in FIG. 3), the task 120 may include storing the non-zero value weights of the sub-regions 303, 304, 305 in separate clusters (i.e., separate arrays of memristor crossbars) having the same sizes as the sub-regions (e.g., 256×256; 128×128; and/or 64×64). That is, the task 120 may include, for example, storing the non-zero value weights of the two sub-regions 303 in two separate clusters each having the same size as the sub-regions 303, storing the non-zero value weights of the six sub-regions 304 in six separate clusters each having the same size as the sub-regions 304, and storing the non-zero value weights of the four sub-regions 305 in four separate clusters each having the same size as the sub-regions 305.

In one or more embodiments, the method 100 also includes a task of identifying clusters (i.e., arrays of memristor crossbars) that were not assigned at least one non-zero value weight during the task 120 of storing the weights in the second sub-block 302 in one or more clusters. In one or more embodiments, before or during the performance of artificial neural network inference by the clusters, the method 100 may include a task of completely cutting off power (e.g., fully power gated) to the clusters that were not assigned at least one non-zero value during task 120. Completely cutting off power to the clusters that were not assigned at least one non-zero value weight during task 120 is configured to reduce the energy required to perform artificial neural network inference by approximately 10× compared to a method in which the power was not cut off to the clusters with only zero value weights.

Figure 4:
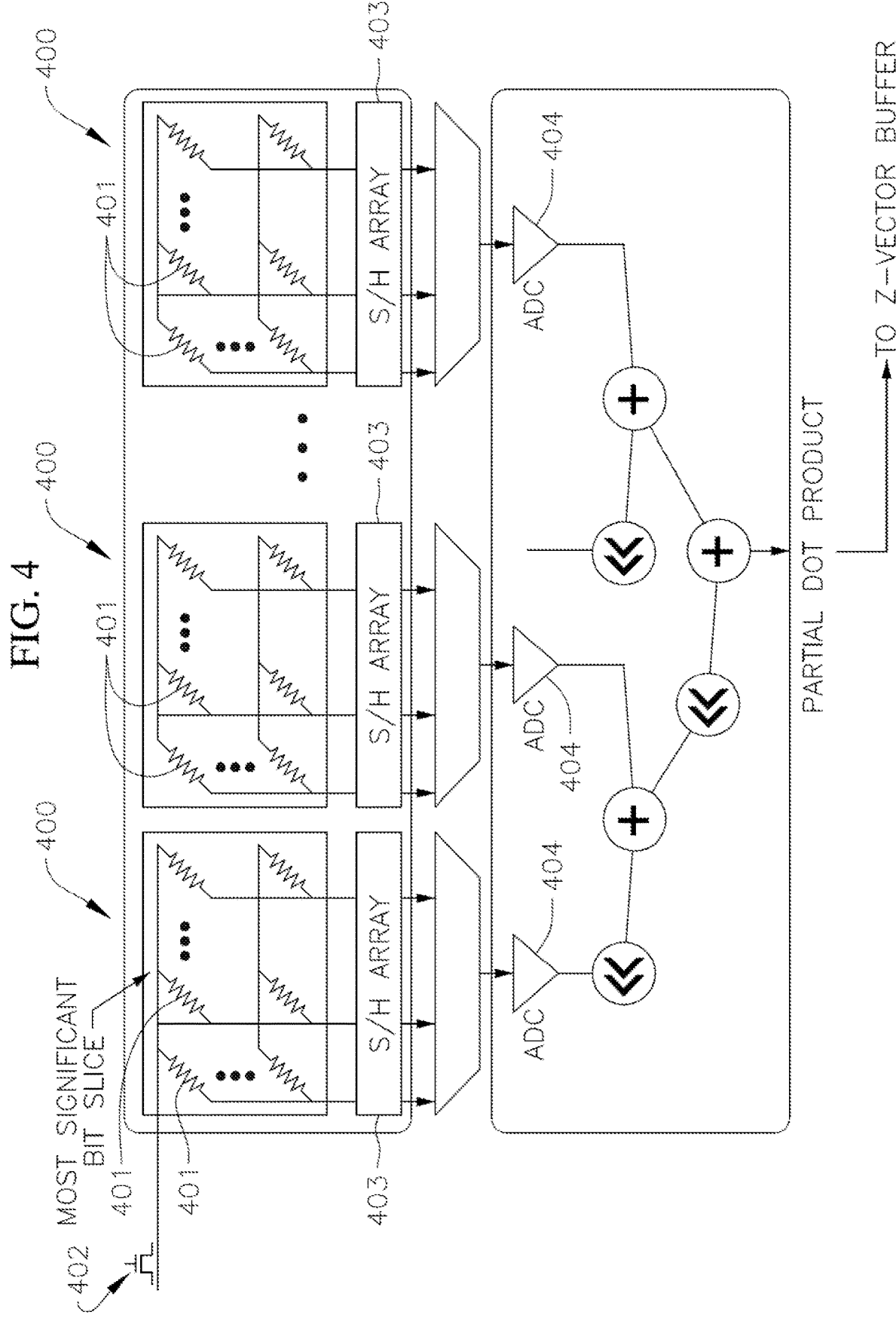
FIG. 4 depicts a series of clusters each including a memristor crossbar array for storing the weights of the trained artificial neural network and performing a matrix-vector-multiplication (MVM) between an input array and the sparse weight matrix according to one embodiment of the present disclosure.

FIG. 4 depicts a series of clusters 400 of a hardware accelerator each including an array of memristor crossbars 401 according to one embodiment of the present disclosure that may be utilized in task 120 to store the non-zero value weights of the second sub-block 302 (e.g., the sub-regions 303, 304, 305). The weights of the second sub-block 302 may be stored in the memristor crossbars 401 of the arrays. The weight stored by each memristor crossbar 401 is proportional to the conductance (i.e., the inverse of resistance) of the memristor crossbar 401. Accordingly, in one or more embodiments, the task 120 of storing the non-zero weights of the second sub-block 302 includes programming the resistances (i.e., the inverse of conductance) of the memristor crossbars 401 of one or more clusters 400 (i.e., one or more arrays of memristor crossbars 401) to correspond to the non-zero weights of the second sub-block 302 (e.g., the task 120 includes programming each memristor crossbar 401 to a resistance level that is inversely proportional to the value of one or more bits of a corresponding weight matrix coefficient). The conductance of each memristor crossbar 401 (and therefore the weight stored in the memristor crossbar 401) may be programmed in task 120 utilizing a selector, such as, for instance, a diode or a field effect transistor (FET) 402 connected in series to the memristor crossbar 401. The memristor crossbars 401 may be any suitable type or kind of memristors, such as, for instance, resistive random access memory (RRAM), conductive-bridging random access memory (CBRAM), phase-change memory (PCM), a ferroelectric field effect transistor (FerroFET), or spin-transfer torque random access memory (STT RAM). RRAM can function as either analog or digital memory and STT can function as a single-bit per cell digital memory. Accordingly, the memristor crossbars 401 function as two or three terminal non-volatile synaptic weights that are either analog or digital (single or multi-bit). In one or more embodiments, the clusters 400 include arrays of memristor crossbars 401 having two or more different sizes (e.g., the accelerator includes clusters 400 having two or more different sizes).

As illustrated in FIG. 4, each cluster 400 also includes a sample and hold array (S/H array) 403 connected to each array of memristor crossbars and an analog-to-digital (ADC) 404 converter configured to convert the dot product computed by each array of memristor crossbars 401 from analog to digital.

In one or more embodiments, the task 120 of storing the weights may include storing the weights in two or more clusters 400 having different sizes (i.e., the task 120 may include storing the non-zero weights in two or more arrays of memristor crossbars having different sizes). For example, in the embodiment of the partitioned sparse weight matrix 300 illustrated in FIG. 3, the task 120 of storing the weights may include a task of storing the weights in the sub-regions 303 in two clusters 400 each having a 256×256 array of memristor crossbars 401, a task of storing the weights in the sub-regions 304 in six clusters 400 each having a 128×128 array of memristor crossbars 401, and a task of storing the weights in the sub-regions 305 in four clusters 400 each having a 64×64 array of memristor crossbars 401.

In one or more embodiments, the task 110 of partitioning the sparse weight matrix 300 includes a task of comparing, recursively, the size of the second sub-block 302 of the partitioned sparse weight matrix to the size of the smallest cluster 400 (i.e., the smallest array of memristor crossbars 401) of the hardware accelerator. If the size of the second sub-block 302 is the same as the size of the smallest cluster 400 implemented by the hardware accelerator, then the method 100 includes tasks of calculating the energy cost of processing the non-zeros within the second sub-block 302 utilizing an unblocked element cluster of the hardware accelerator, comparing the calculated energy cost to the energy cost of operating the smallest cluster 400, and assigning the weights of the second sub-block 302 to the cluster 400 (e.g., analog or unblocked) that exhibits the lower energy cost. In one or more embodiments, the unblocked element cluster includes an unblocked element buffer and one or more digital arithmetic logic units (ALUs). If the size of the second sub-block 302 is larger than the size of the smallest cluster 400 (i.e., the smallest array of memristor crossbars 401) implemented on the hardware accelerator, then the method 100 includes sub-partitioning the second sub-block 302 into smaller sub-regions (e.g., the third, fourth, and fifth sub-regions 303, 304, 305 illustrated in FIG. 3) that have sizes matching the sizes of the clusters 400 (e.g., the arrays of memristor crossbars 401) of the hardware accelerator. Additionally, if the size of the second sub-block 302 is larger than the size of the smallest cluster 400 implemented on the hardware accelerator, the method 100 includes tasks of calculating the total energy cost of operating each of the clusters 400 corresponding to the sub-regions (e.g., summing the energy costs of processing the non-zeros in the sub-regions 303, 304, 305 with separate clusters 400 having arrays of memristors 401 corresponding to the sizes of the sub-regions 303, 304, 305) and comparing the sum of the energy costs to the energy cost of mapping the entire second sub-block 302 to a single cluster 400 having an array of memristor crossbars 401 that is the same size as the second sub-block 302, and partitioning the second sub-region 302 and storing the weights according to the method that exhibits the lower energy cost. That is, if the second sub-region 302 is larger than the smallest cluster 400 (i.e., if the second sub-region 302 is larger than the cluster 400 with the smallest array of memristor crossbars 401), then the method 100 may include partitioning the second sub-block 302 into smaller sub-regions (e.g., sub-regions 303, 304, 305) and mapping the non-zero weight coefficients in the sub-regions onto memristor crossbar arrays 401 having the same sizes as the sub-regions, or the method may include not partitioning the second sub-block 302 and mapping the non-zero weight coefficients in the second sub-block 302 onto a single array of memristor crossbars 401 having the same size as the second sub-block 302, depending on which results in the lower energy cost.

With continued reference to the embodiment illustrated in FIG. 1, the method 100 also includes a task 130 of performing a digital or analog matrix-vector-multiplication (MVM) between a weight matrix and a corresponding input vector. In one or more embodiments, the task 130 is performed utilizing the clusters 400 of arrays of memristor crossbars 401 illustrated in FIG. 4, with each cluster 400 being configured to perform an MVM operation between a weight matrix and an input vector. The MVM task 130 may be performed by applying an array of voltage signals to the clusters 400 (e.g., the clusters illustrated in FIG. 4). The array of voltage signals correspond to the inputs to the neurons 202, 204, 206 in the artificial neural network 200. When the array of voltage signals are applied to the rows of the array of memristor crossbars 401, the current measured at each column of the array is a sum of the inputs multiplied by the conductance of the corresponding memristor crossbar 401 in that column (e.g., the current at each column is a weighted sum of the input voltages). In this manner, the array of memristor crossbars 401 automatically performs a multiply and accumulate (MAC) operation between an input vector (which represents inputs to the neurons 202, 204, 206 in a given layer 201, 203, 205) and the conductances of the memristor crossbars 401 (which represent the weights of the connections 207, 208 between the neurons 202, 204, 206) and calculates an output vector representing the outputs from the neurons 202, 204, 206 in a given layer 201, 203, 205 of the artificial neural network 200.

Still referring to the embodiment illustrated in FIG. 1, the method 100 also includes a task 140 of adding the output vector resulting from the task 130 of performing the MVM with one cluster 400 to a running vector sum sent from a different cluster 400 (e.g., the task 140 includes calculating the running vector sum from the results of the MVMs performed, in task 130, by the arrays of memristor crossbars 401 in the clusters 400 illustrated in FIG. 4). In the illustrated embodiment, the method 100 also includes a task 150 of calculating a set of neural network activation functions based on the task 140 of calculating the running vector sum (e.g., the task 150 includes calculating the activation functions of the artificial neural network 100 based on the running vector sum calculated from the results of the MVM performed by the arrays of memristor crossbars 401 in the clusters 400 illustrated in FIG. 4) and sending the results to a destination cluster.

Figure 5:
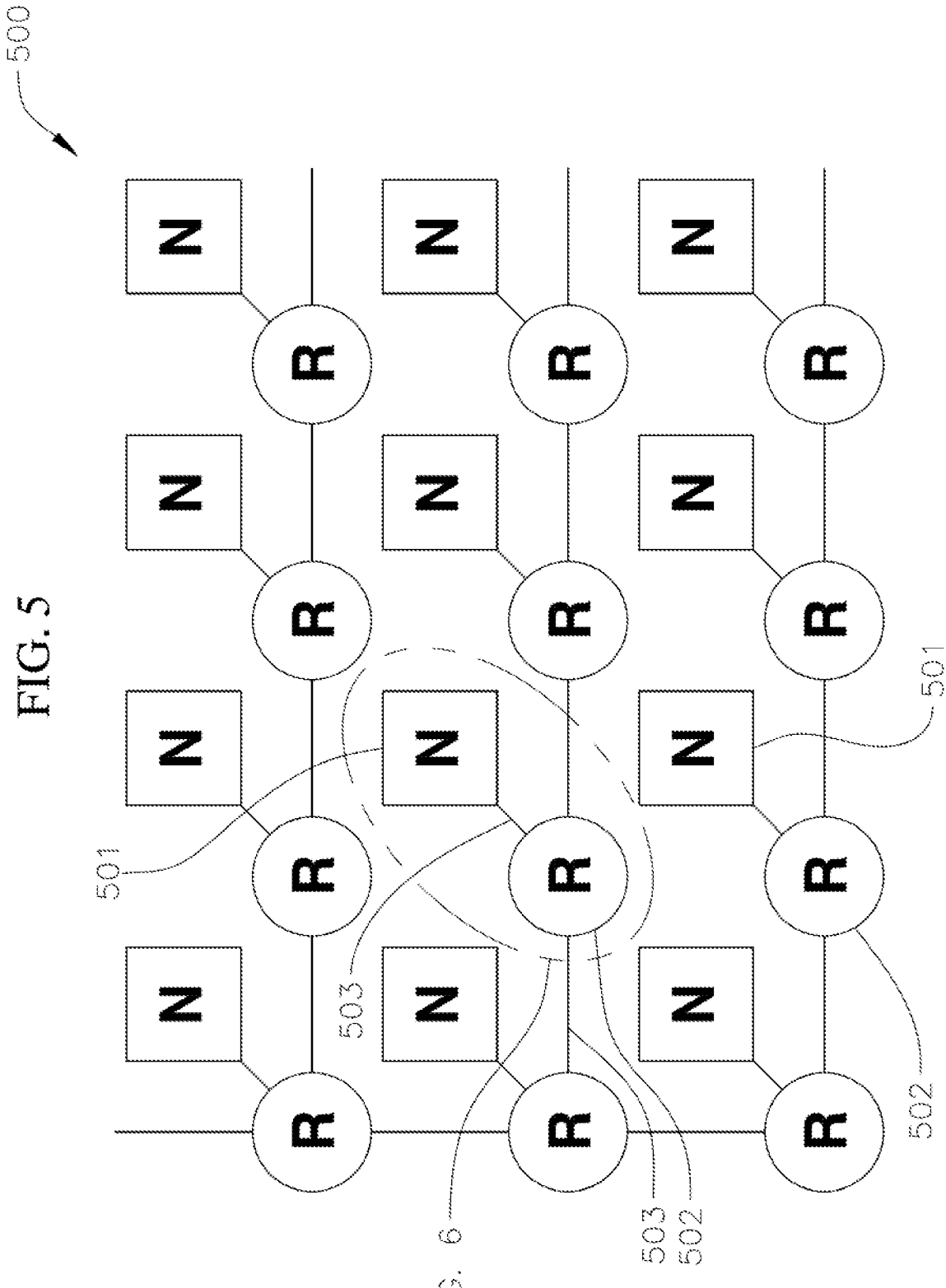
FIG. 5 depicts a network-on-chip (NoC) system architecture including an array of nodes each including a router and a computational node according to one embodiment of the present disclosure.
Figure 6:
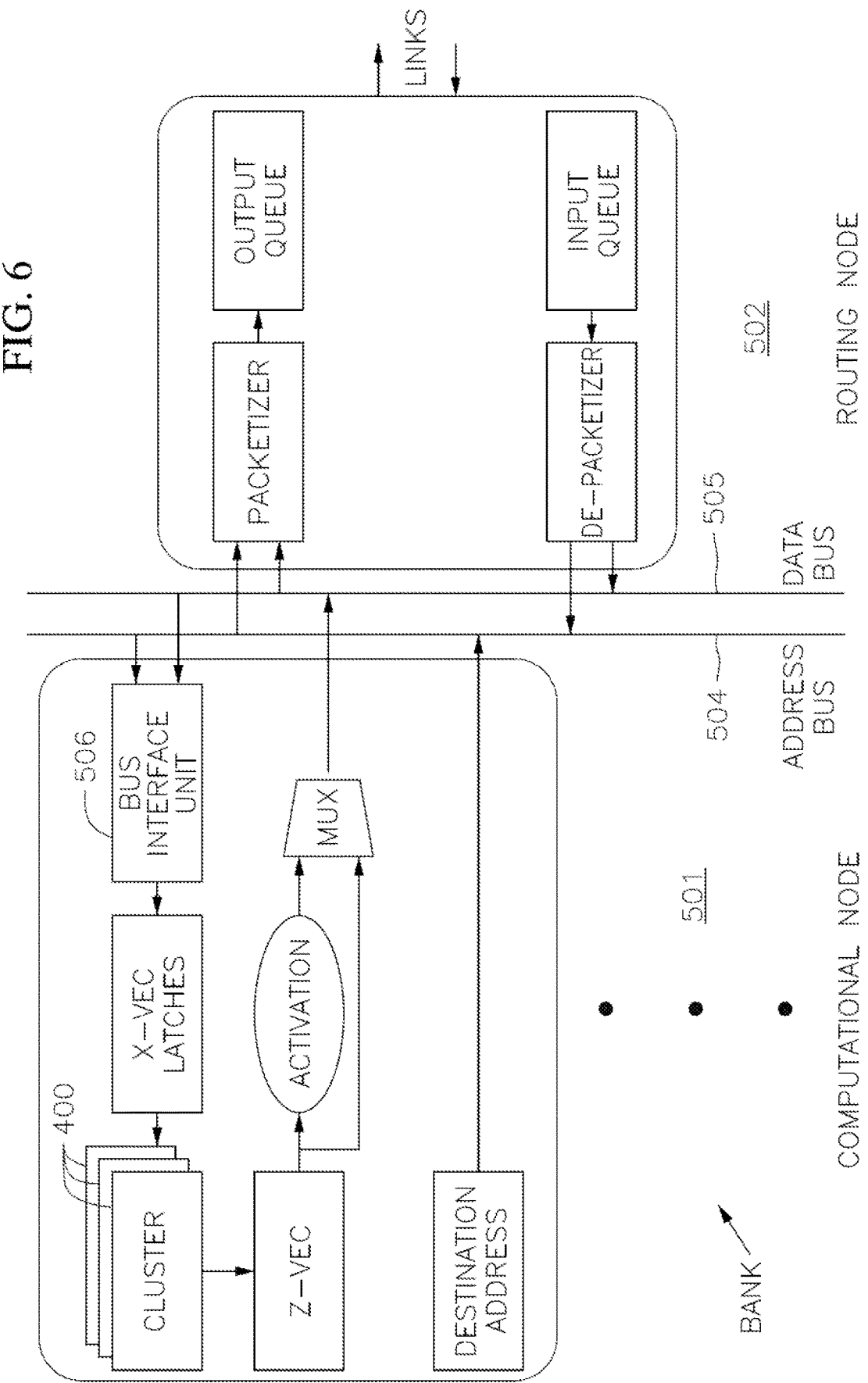
FIG. 6 depicts a computational node according to one embodiment of the present disclosure.

FIG. 5 depicts a network-on-chip (NoC) 500 according to one embodiment of the present disclosure including a series of computational nodes 501, a series of routing nodes 502 connected to the computational nodes 501, and a series of data and address lines 503 connected to the computational and routing nodes 501, 502. In one or more embodiments, the computational nodes 501 may be connected via modular NoC fabric and may be configured utilizing mature direct memory access (DMA) configuration techniques. FIG. 6 depicts one of the computational nodes 501 connected to one of routing nodes 502 of the NoC 500 illustrated in FIG. 5. As illustrated in FIG. 6, each of the computational nodes 501 includes a series of clusters 400 each having an array of memristor crossbars 401 (e.g., each of the computational nodes 501 includes the arrays of memristor crossbars 401 illustrated in FIG. 4) and a series of selectors (e.g., diodes or FETs 402 illustrated in FIG. 4) for programming the conductance (i.e., the weight) stored by each memristor crossbar 401. Additionally, as illustrated in FIG. 6, the NoC 500 also includes a pair of address and data buses 504, 505, respectively, for each pair of computational nodes 501 and routing nodes 502 on which input and output vector coefficients and their destination addresses are broadcast, either by a cluster 400 within the computational node 501 or by the NoC routing node 502 that services that computational node 501. Additionally, in the embodiment illustrated in FIG. 6, each computational node 501 includes a bus interface unit 506 configured to receive input vector coefficients and their addresses. The bus interface unit 506 is configured (e.g., programmed with control logic) to direct the input vector coefficients to the appropriate memristor crossbar 401 inputs.

The task 140 of calculating the running vector sum from the results of the MVMs performed, in task 130, by the clusters 400 may be performed utilizing the NoC 500 illustrated in FIGS. 4-5. Additionally, the method 100 may include sending the calculated running vector sum calculated in task 140 and the activation functions calculated in task 150 to a destination cluster 400 on either the same computational node 501 or a different computational node 501.

The methods of the present disclosure may be performed by a processor executing instructions stored in non-volatile memory. The term "processor" is used herein to include any combination of hardware, firmware, and software, employed to process data or digital signals. The hardware of a processor may include, for example, application specific integrated circuits (ASICs), general purpose or special purpose central processors (CPUs), digital signal processors (DSPs), graphics processors (GPUs), and programmable logic devices such as field programmable gate arrays (FPGAs). In a processor, as used herein, each function is performed either by hardware configured (i.e., hard-wired) to perform that function, or by more general purpose hardware, such as a CPU, configured to execute instructions stored in a non-transitory storage medium. A processor may be fabricated on a single printed wiring board (PWB) or distributed over several interconnected PWBs. A processor may contain other processors; for example a processor may include two processors, an FPGA and a CPU, interconnected on a PWB.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims, and equivalents thereof.

What is claimed is:

1. A method of storing a sparse weight matrix for a trained artificial neural network in a circuit comprising a plurality of clusters, the method comprising:
    partitioning the sparse weight matrix, based on an arrangement of zero-value weights and non-zero value weights in the sparse weight matrix, into at least one first sub-block and at least one second sub-block, the at least one first sub-block comprising a plurality of weight values, the plurality of weight values of the at least one first sub-block containing only zero-value weights and the at least one second sub-block comprising non-zero value weights; and
    assigning the non-zero value weights in the at least one second sub-block to at least one cluster of the plurality of clusters of the circuit,
    wherein the circuit is configured to perform matrix-vector-multiplication (MVM) between the non-zero value weights of the at least one second sub-block and an input vector.

2. The method of claim 1, further comprising identifying clusters of the plurality of clusters that were not assigned at least one non-zero value weight during the assigning the non-zero value weights.

3. The method of claim 2, further comprising completely cutting off power to the clusters that were not assigned at least one non-zero value weight.

4. The method of claim 1, wherein each cluster of the plurality of clusters comprises an array of memristors.

5. The method of claim 4, wherein the memristors are selected from the group consisting of resistive random access memory (RRAM), conductive-bridging random access memory (CBRAM), phase-change memory (PCM), a ferroelectric field effect transistor (FerroFET), spin-transfer torque random access memory (STT RAM), and combinations thereof.

6. The method of claim 4, wherein the assigning the non-zero value weights comprises setting, utilizing a plurality of selectors connected in series to the memristors, a resistance of each of the memristors.

7. The method of claim 1, wherein:
    the sparse weight matrix has a size of 512×512,
    the at least one first sub-block has a size of 256×256, and
    the at least one second sub-block has a size selected from the group consisting of 128×128, 64×64, and 32×32.

8. The method of claim 1, wherein the partitioning the sparse weight matrix comprises comparing, recursively, a size of the at least one second sub-block to a size of a smallest cluster of the plurality of clusters.

9. The method of claim 8, wherein, if the size of the at least one second sub-block is equal to the size of the smallest cluster, the method further comprises:
    calculating a first energy cost of processing the non-zero value weights utilizing an unblocked element cluster comprising an unblocked element buffer and at least one digital arithmetic logic unit;
    calculating a second energy cost of processing the non-zero value weights with the smallest cluster;
    determining a lower energy cost among the first energy cost and the second energy cost; and
    assigning the non-zero value weights to the unblocked element cluster or the smallest cluster depending on the lower energy cost.

10. The method of claim 8, wherein, if the size of the at least one second sub-block is larger than the size of the smallest cluster, the method further comprises:

sub-partitioning the at least one second sub-block into a plurality of sub-regions having sizes matching sizes of a first plurality of clusters of the plurality of clusters;
calculating a first total energy cost of processing the non-zero value weights of each of the plurality of sub-regions with the first plurality of clusters;
calculating a second total energy cost of processing the non-zero value weights of the second sub-block with a single cluster having a same size as the second sub-block;
determining a lower total energy cost among the first total energy cost and the second total energy cost; and
assigning the non-zero value weights of the plurality of sub-regions to the first plurality of clusters or assigning the non-zero value weights of the at least one second sub-block to the single cluster depending on the lower total energy cost.

11. A system for performing inference with an artificial neural network having a sparse weight matrix, the system comprising:
a network-on-chip comprising a plurality of clusters, each cluster of the plurality of clusters comprising an array of memristor crossbars;
a processor; and
a non-transitory computer-readable storage medium having instructions stored therein, which, when executed by the processor, cause the processor to:
partition the sparse weight matrix, based on an arrangement of zero-value weights and non-zero value weights in the sparse weight matrix, into at least one first sub-block and at least one second sub-block, the at least one first sub-block comprising a plurality of weight values, the plurality of weight values of the at least one first sub-block containing only zero-value weights and the at least one second sub-block comprising non-zero value weights; and
assign the non-zero value weights in the at least one second sub-block to at least one cluster of the plurality of clusters of the metwork-on-chip,
wherein the network-on-chip is configured to perform matrix-vector-multiplication (MVM) between the non-zero value weights of the at least one second sub-block and an input vector.

12. The system of claim 11, wherein the instructions, when executed by the processor, further cause the processor to identify clusters of the plurality of clusters that were not assigned at least one non-zero value weight.

13. The system of claim 12, wherein the instructions, when executed by the processor, further cause the processor to completely cut off power to the clusters that were not assigned at least one non-zero value weight.

14. The system of claim 11, wherein each memristor of the array of memristor crossbars is selected from the group consisting of resistive random access memory (RRAM), conductive-bridging random access memory (CBRAM), phase-change memory (PCM), a ferroelectric field effect transistor (FerroFET), and spin-transfer torque random access memory (STT RAM).

15. The system of claim 11, wherein the network-on-chip further comprises a plurality of selectors connected in series to the array of memresistor crossbars, and wherein the instructions, when executed by the processor, further cause the processor to assign the non-zero value weights by setting a resistance of the memristor crossbars utilizing the selectors.

16. The system of claim 11, wherein:
the sparse weight matrix has a size of 512×512,
the at least one first sub-block has a size of 256×256, and
the at least one second sub-block has a size selected from the group consisting of 128×128, 64×64, and 32×32.

17. The system of claim 11, wherein the instructions, when executed by the processor, further cause the processor to compare, recursively, a size of the at least one second sub-block to a size of a smallest cluster of the plurality of clusters.

18. The system of claim 17, wherein, if the size of the at least one second sub-block is equal to the size of the smallest cluster, the instructions further cause the processor to:
calculate a first energy cost of processing the non-zero value weights utilizing an unblocked element cluster comprising an unblocked element buffer and at least one digital arithmetic logic unit;
calculate a second energy cost of processing the non-zero value weights with the smallest cluster;
determine a lower energy cost among the first energy cost and the second energy cost; and
assign the non-zero value weights to the unblocked element cluster or the smallest cluster depending on the lower energy cost.

19. The system of claim 17, wherein, if the size of the at least one second sub-block is larger than the size of the smallest cluster, the instructions, when executed by the processor, further cause the processor to:
sub-partition the at least one second sub-block into a plurality of sub-regions having sizes matching sizes of a first plurality of clusters of the plurality of clusters;
calculate a first total energy cost of processing the non-zero value weights of each of the plurality of sub-regions with the first plurality of clusters;
calculate a second total energy cost of processing the non-zero value weights of the second sub-block with a single cluster having a same size as the second sub-block;
determine a lower total energy cost among the first total energy cost and the second total energy cost; and
assign the non-zero value weights of the plurality of sub-regions to the first plurality of clusters or assign the non-zero value weights of the at least one second sub-block to the single cluster depending on the lower total energy cost.

20. A non-transitory computer-readable storage medium having software instructions stored therein, which, when executed by a processor, cause the processor to:
partition a sparse weight matrix of an artificial neural network, based on an arrangement of zero-value weights and non-zero value weights in the sparse weight matrix, into at least one first sub-block and at least one second sub-block, the at least one first sub-block comprising a plurality of weight values, the plurality of weight values of the at least one first sub-block containing only zero-value weights and the at least one second sub-block comprising non-zero value weights; and
assign the non-zero value weights in the at least one second sub-block to at least one cluster of a network-on-chip comprising an array of memristor crossbars.

* * * * *

UNITED STATES PATENT AND TRADEMARK OFFICE
CERTIFICATE OF CORRECTION

PATENT NO. : 11,816,563 B2
APPLICATION NO. : 16/409487
DATED : November 14, 2023
INVENTOR(S) : Titash Rakshit et al.

It is certified that error appears in the above-identified patent and that said Letters Patent is hereby corrected as shown below:

In the Claims

In Column 13, Line 39, in Claim 11, delete "metwork" and insert -- network --.

Signed and Sealed this
Eighth Day of October, 2024

Katherine Kelly Vidal
*Director of the United States Patent and Trademark Office*